United States Patent [19]

Olinger et al.

[11] Patent Number: 5,662,981
[45] Date of Patent: Sep. 2, 1997

[54] MOLDED COMPOSITE PRODUCT AND METHOD OF MAKING

[75] Inventors: John L. Olinger, Newark; Jean E. Schelhorn, Granville; Ralph B. Jutte, Hebron, all of Ohio

[73] Assignee: Owens-Corning Fiberglas Technology Inc., Summit, Ill.

[21] Appl. No.: 641,462

[22] Filed: Apr. 30, 1996

[51] Int. Cl.$^6$ ..................................................... B32B 9/00
[52] U.S. Cl. ........................... 428/113; 428/212; 428/220; 428/311.11; 428/311.5; 264/113; 264/122; 264/257; 264/288.8
[58] Field of Search .................................. 428/246, 260, 428/213, 286, 290, 298, 300, 195, 236, 238, 239, 311.1, 311.5, 287, 113, 288, 220, 409; 264/288.8, 113, 122, 257, 86

[56] References Cited

U.S. PATENT DOCUMENTS

| | | |
|---|---|---|
| 3,871,811 | 3/1975 | Barry et al. . |
| 3,932,980 | 1/1976 | Mizutani et al. . |
| 4,170,511 | 10/1979 | Milne . |
| 4,510,201 | 4/1985 | Takeuchi et al. .................. 428/285 |
| 4,778,717 | 10/1988 | Fitchmun ........................... 428/246 |
| 4,921,658 | 5/1990 | Pennington et al. ................ 264/86 |
| 4,970,044 | 11/1990 | Kim et al. . |
| 4,973,440 | 11/1990 | Tamura et al. . |
| 5,248,551 | 9/1993 | Kelman et al. . |
| 5,312,669 | 5/1994 | Bedard ............................... 428/105 |
| 5,328,494 | 7/1994 | Kelman et al. . |
| 5,525,412 | 6/1996 | Blakeman et al. ................. 428/346 |

FOREIGN PATENT DOCUMENTS

| | | |
|---|---|---|
| 0653290 | 7/1994 | European Pat. Off. . |
| 0638414 | 7/1994 | European Pat. Off. . |

*Primary Examiner*—Patrick Ryan
*Assistant Examiner*—Abraham Bahta
*Attorney, Agent, or Firm*—C. Michael Gegenheimer

[57] ABSTRACT

A molded composite product includes a resinous core layer containing reinforcement fibers, and a resinous surface layer which is substantially free of reinforcement fibers, where the resinous surface layer includes a nonresinous additive at a concentration, measured as a weight percentage of the resinous material in the surface layer, which is higher than the concentration of the additive in the resinous core layer, measured as a weight percentage of the resinous material in the core layer.

20 Claims, 2 Drawing Sheets

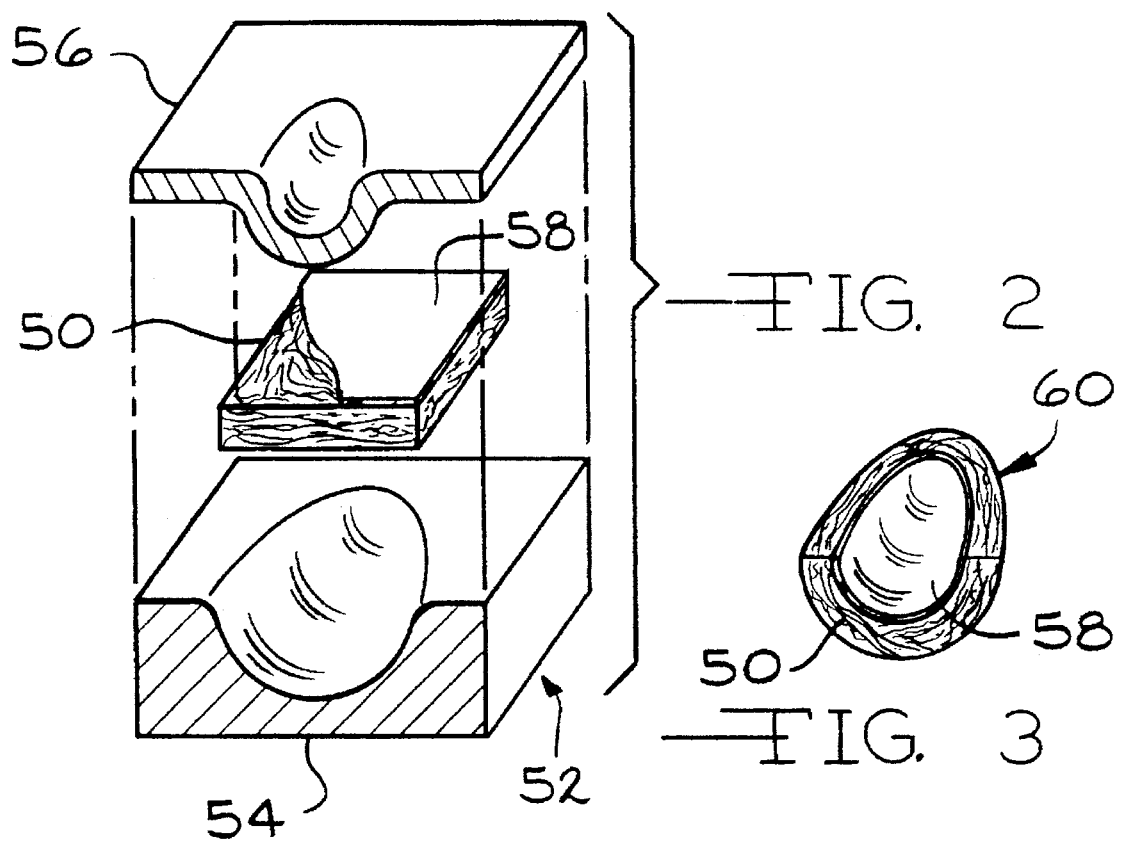
FIG. 2
FIG. 3
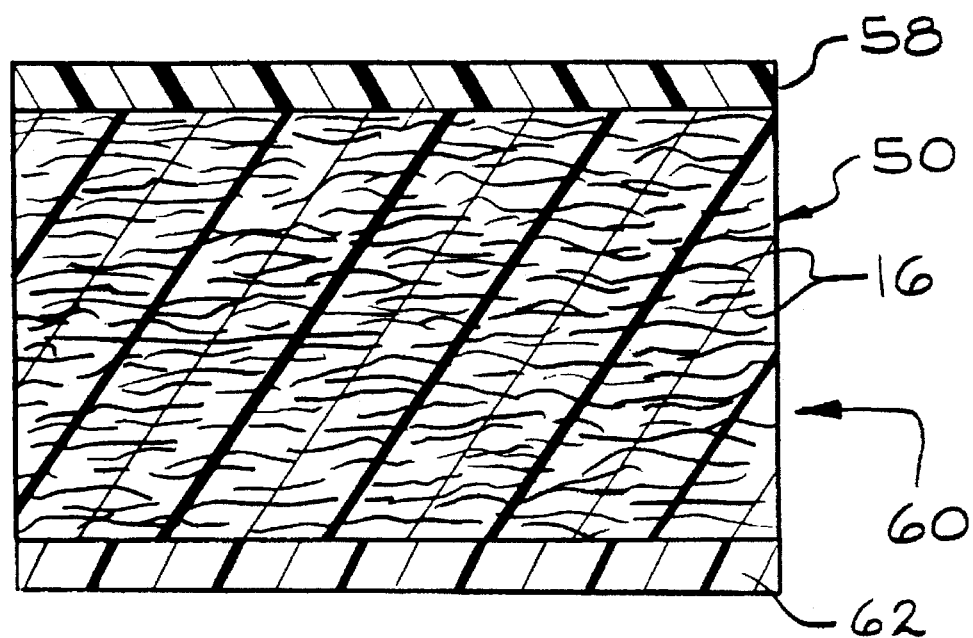
FIG. 4

MOLDED COMPOSITE PRODUCT AND METHOD OF MAKING

TECHNICAL FIELD

This invention relates to composite sheets suitable for molding into articles of manufacture. More particularly, this invention relates to composite sheets of a moldable resin and mineral fiber reinforcement materials, and molded composite products.

BACKGROUND ART

Numerous articles of commerce are manufactured by subjecting a moldable composite sheet to a molding process. The moldable composite sheets usually comprise a thermoplastic resin such as a polypropylene resin which is reinforced with reinforcement fibers such as a glass fiber mat. These composite sheets are commonly referred to as glass mat thermoplastics or GMT. These composite sheets can be heated to soften the resin and molded under pressure to make various articles such as parts for automobiles, cabinetry for computers and other electronic equipment, components for small appliances, and recreational, agricultural and other durable consumer and industrial goods. A typical molding process for these composite sheets is compression molding in which the moldable composite sheet is heated, pressed into a mold, and subjected to pressure in a relatively cold mold to form the molded part. The resin and reinforcement material flow during the molding process to fill out the entire volume of the mold.

A compression molding technique is disclosed in U.S. Pat. No. 4,970,044 to Kim et al., which is hereby incorporated by reference. Kim et al. teach that a deformable plastic film can be placed on the surface of a thermoplastic charge prior to compression molding. The film acts as an insulator to prevent the relatively cold mold from cooling the thermoplastic charge so fast that the surface of the charge becomes moldable. Kim et al. further teach that the film can be compatible with the thermoplastic charge so that the molding process bonds the film to the charge, thereby producing a molded composite product.

Moldable composite sheets and molded composite products often contain additives that are nonresinous but are used to enhance the molded product. An example of an additive is a colorant. Various pigments are added to the resin so that the molded product has the desired color. One of the problems with using additives in molded composite sheets is the cost of the additives. Frequently, the cost of the additive is a substantial fraction of the total raw material cost of the molded product. It would be advantageous if the cost of molded composite products containing additives could be reduced.

DISCLOSURE OF INVENTION

There has now been developed an improved molded composite product having a resinous core layer containing reinforcement fibers and a resinous surface layer which is substantially free of reinforcement fibers, where the resinous surface layer includes a nonresinous additive at a concentration, measured as a weight percentage of the resinous material in the surface layer, which is higher than the concentration of the additive in the resinous core layer, measured as a weight percentage of the resinous material in the core layer. By concentrating the expensive additives in the surface layer, the material cost can be lowered, while still providing a molded composite product having the desired surface characteristics for the product. The invention also encompasses the moldable composite sheet capable of being molded into a molded composite product.

In a preferred embodiment of the invention the ratio of the concentration of the nonresinous additive in the surface layer to the concentration of the nonresinous additive in the core layer is greater than about 6:1, and preferably greater than about 10:1. In some embodiments of the invention the core layer is substantially free of the nonresinous additive.

The nonresinous additive can include one or more materials selected from the group consisting of colorants, tougheners, antioxidants, UV stabilizers, fillers, flame retardants, fungicides, algaecides, electrically conductive particles and fibers, antimicrobials, antistats, color concentrates, heat stabilizers, mold release agents, smoke suppressants, surface active agents, pigments, and flexibilizers.

In a preferred embodiment, the thickness of the surface layer is within the range of from about 0.1 mm to about 1 mm, and the thickness of the core layer is within the range of from about 2 mm to about 2 cm.

According to this invention there is also provided a method for molding a composite product comprising preparing a charge of resinous core material containing reinforcement fibers and applying a resinous surface layer, which is substantially free of reinforcement fibers, to the surface of the charge of core material. The resinous surface layer includes a nonresinous additive at a concentration, measured as a weight percentage of the resinous material in the surface layer, which is higher than the concentration of the additive in the resinous core layer, measured as a weight percentage of the resinous material in the core layer. The charge and surface layer are introduced into a mold, and the charge and surface layer are molded to form a composite product having a core layer and a surface layer.

In another embodiment of the invention, the temperature of the core material is at least 20° C. higher, and preferably at least 100° C. higher than the temperature of the mold as the charge of core material and surface layer is introduced into the mold. Preferably, the temperature of the mold is cool enough to inhibit softening of the surface layer so that reinforcement fibers from the core material are prevented from migrating into or penetrating the surface layer to an extent that the reinforcement fibers are visible in the molded composite product.

BRIEF DESCRIPTION OF DRAWINGS

FIG. 2 is a schematic view in perspective of a moldable composite sheet being placed in a compression mold for molding according to the invention.

FIG. 3 is a schematic view in perspective of the molded composite product of the invention, after compression molding.

FIG. 4 is a schematic cross-sectional view in elevation of a portion of the molded composite product of the invention.

BEST MODE FOR CARRYING OUT THE INVENTION

Figure 1:
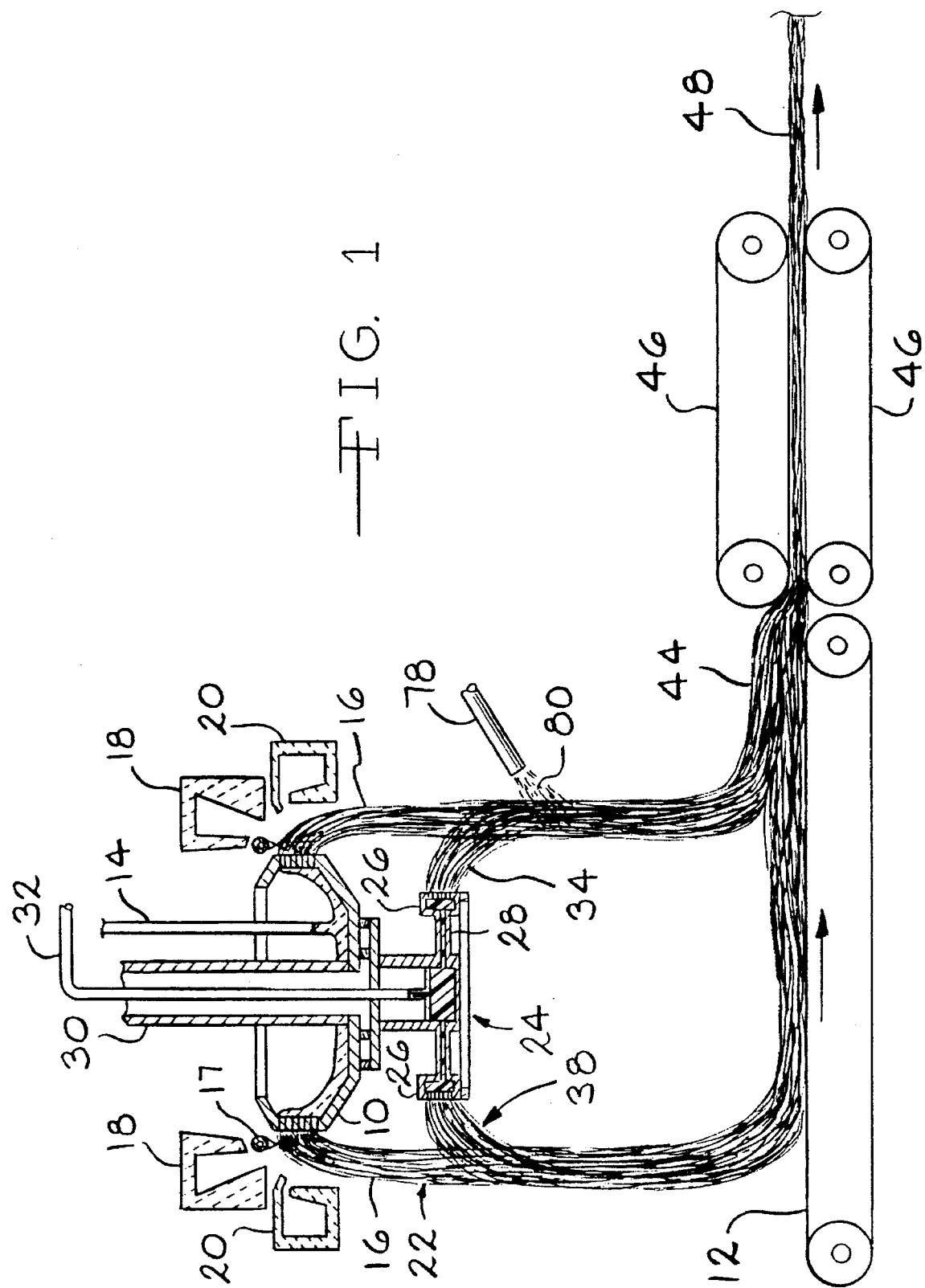
FIG. 1 is a schematic view in elevation of a glass fiber spinner and an organic fiber spinner for cofiberizing centrifuged glass fibers with polymeric material to produce a preferred moldable composite sheet to be used with the invention.

The invention will be described in terms illustrating reinforcement of the composite sheet with glass fibers, although it is to be understood that the invention can be practiced using reinforcements of other heat softenable mineral material, such as rock, slag, and basalt. Also, the invention can be practiced using organic reinforcement material, examples of which include polymers such as polypropylene, polyethylene terephthalate, polycarbonate, polyvinyl chloride and polyphenylene sulfide.

As shown in FIG. 1, a rotary mineral fiber spinner, such as glass fiber spinner 10, is arranged above a collecting surface, such as conveyor 12. The glass fiber spinner can be any device suitable for the rotary centrifugation of glass fibers from molten glass. Examples of rotary fiberizers are well known in the art. A stream of molten glass 14 is dropped onto the bottom of the glass fiber spinner, and the molten glass is centrifuged through the orificed spinner peripheral wall to form glass fibers 16. The glass is preferably a wool glass of the type typically used for the rotary process, often referred to as a sodium-aluminum borosilicate glass. While there is no intent to limit the present invention to a specific glass composition, by way of example a common composition would include in parts by weight approximately 6 percent CaO, 5 percent $B_2O_3$, 4 percent MgO, and 15 percent $Na_2O$, with the remainder of the composition being primarily alumina and silica. The amount of soda ($Na_2O$) is preferably at least 10 percent, and more preferably at least 12 percent by weight. Optionally, a size can be applied to the glass fibers via an annular applicator ring 17 positioned immediately radially outwardly from the spinner. A preferred size comprises a polyolefin emulsion, a silane coupling agent, and an organic acid, as described in U.S. Pat. No. 4,448,917 to Black et al.

The glass fiber fiberizer can be equipped with an annular burner 18 to facilitate the fiberizing process, although in some glass fiber operations an external burner is not required. An annular blower 20 can also be used to turn the glass fibers downward to form a downwardly moving column of glass fibers and hot gasses, such as glass fiber veil 22.

Mounted generally coaxially with the glass spinner is an organic fiber spinner, such as polymer fiber spinner 24. The spinner can be similar to conventionally used spinners for fiberizing glass, or alternatively can be comprised of a plurality of rotating polymer distributing devices, such as nozzles 26. The nozzles can be disposed at the ends of a plurality of delivery conduits, such as pipes 28. The polymer fiber spinner can be rotated by any suitable device, such as by spindle 30. Molten organic material, such as polymer material, is delivered to the polymer fiber spinner by any suitable means, such as conduit 32. The molten polymer material is fed through the pipes to the nozzles and centrifuged into polymer fibers 34. Each nozzle can be adapted with up to 1,000 orifices or more for centrifuging fine streams of polymer material. After the polymer fibers are formed, they are turned into a downwardly moving veil 38 of polymer fibers. The operation of a rotary cofiberizing is disclosed in greater detail in U.S. Pat. Nos. 5,458,822 to Bakhshi et al. and 5,490,961 to Bakhshi et al.

Although the preferred organic material is a thermoplastic resin, it is to be understood that any organic material capable of being distributed in a cofiberizing process can be used as the resin of the invention. Particularly useful examples of polymers include such material as polyethylene terephthalate (PET), polypropylene or polyphenylene sulfide (PPS). Other organic materials possibly suitable for fiberization include thermoplastic resins, particularly from the group consisting essentially of other polyolefins, polyamides, polyesters, polysulfides, polycarbonates, polyvinyl chloride (PVC), urethanes and asphalt, or combinations thereof. Also potentially useful with the invention are thermoset resins, particularly those from the group consisting of epoxies, polyesters, phenolics and urethanes, or combinations thereof.

The glass fiber veil 22 and the polymer fiber veil 38 overlap, thereby cofiberizing or integrating the glass fibers 16 and polymer fibers 34. The polymer fibers can be of any size. The integrated glass fibers and polymer fibers are collected on the conveyor as an integrated or cofiberized mass 44 of polymeric material and glass fibers. Preferably, the mineral fibers comprise an amount within the range of from about 20 to about 55 percent by weight of the composite. In a subsequent step, the integrated mass of glass fibers and polymer material can optionally be treated with a heating device, such as heated double belt press 46, to produce a consolidated product, such as pressed composite sheet 48. Alternatively, the integrated mass 44 can be heated prior to being subjected to the double belt press. Other in-line processes for consolidation can be used. The consolidation step compacts the composite sheet and removes the air voids in the material. Consolidation typically results in a composite sheet with a density within the range of from about 0.4 to about 2.0 $g/cm^3$, and preferably a density for polypropylene within the range of from about 0.96 to about 1.28 $g/cm^3$. The preferred density for PET would be higher, as will be appreciated by those skilled in the art. Although the consolidation step is shown as an in-line operation, consolidation can occur in a subsequent operation. Also, two or more consolidation steps can be carried out, with the reconsolidation step serving to further compress out any voids in the composite sheet.

The heat of the hot gases may cause some of the polymer fibers coming into contact with the veil to become softened to the extent that they lose their fibrous form and become attached to the mineral fibers. Since the glass fiber spinner normally operates at a temperature above 925° C., the polymer fibers are rapidly thrust into a region of high temperature, causing the polymer fibers to soften. Under certain conditions some of the polymer fibers will melt, forming droplets or other particles which attach themselves to some of the mineral fibers. Others of the polymer fibers retain their fibrous shape, resulting in the presence of polymer fibers on the conveyor. It is possible that all of the polymer fibers would melt or otherwise deform so that they are no longer in a fibrous form. Therefore, what is collected on the conveyor may be not just glass fibers and polymer fibers, but rather may be glass fibers and polymer material in non-fibrous form.

Although the process described and shown in the drawings shows the reinforcement fibers being made with a rotary process, it is to be understood that the reinforcement fibers could be made using a nonrotary process, such as a textile process.

As shown in FIGS. 2 and 3, a core layer 50 can be molded with a thermoplastic compression molding process in any suitable mold, such as compression mold 52 having mold bottom or base 54 and mold top 56. The core layer can be any suitable reinforced resinous layer for molding into a molded article. A preferred core layer is a consolidated sheet from the glass/polymer cofiberizing process illustrated in FIG. 1. The core layer 50 is preferably heated before it is inserted into the mold. Typically, the mold will be at a temperature within the range of from about 150° C. to about 325° C. and the core layer will be heated to a temperature within the range of from about 200° C. to about 315° C.

Prior to molding, a resinous surface layer 58 is added to the core layer. The film acts as an insulator to retard heat transfer from the core layer to the mold. Preferably, the resinous surface layer contains no reinforcement fibers so that no fibers show in the surface of the finished, molded composite product 60. Films that can be used for the resinous surface layer include high temperature thermoplastics or thermoset materials, such as polytetrafluoroethylene, PET, PVC, PPS, and polycarbonate. Preferably, the material has low heat transfer characteristics. During the molding process the charge of the resinous core material 50 and the resinous film or surface layer 58 are bonded together to form the molded composite product 60. It is to be understood that the film or surface layer 58 can be added during the manufacturing process either before or after the consolidation process shown in FIG. 1. Also, the film can be added at the time of manufacture of the moldable composite sheet, or at a later time, immediately prior to the molding process. Further, the molding process could be an in-line process immediately following the manufacture of the moldable consolidated sheet. In such a case, the consolidated sheet would be heated, and the resinous surface layer would be added.

As shown in FIG. 4, the moldable composite sheet has a surface layer 58 and the core layer 50. The reinforcement fibers 16 in the core layer do not extend into the surface layer and therefore the composite sheet has the desired appearance. The surface layer can be relatively thin compared with the core layer. The ratio of thickness of the surface layer to the thickness of the core layer is greater than 1:4 and preferably within the range of from about 1:6 to about 1:30. The thickness of the surface layer is preferably within the range of from about 0.1 mm to about 1 mm, and the thickness of the core layer is preferably within the range of from about 2 mm to about 2 cm, although molded composite sheets of the invention can be made with layers of different thicknesses.

As shown in FIG. 4, the moldable composite sheet can also include a second surface layer 62 in addition to the first surface layer 58. This second surface layer can be used to structurally balance the molded composite product by providing similar forces on the core from two opposite sides of the core. The second surface layer can be the same as the resinous surface layer, or can be different. The second layer can be provided with the same additives as are in the resinous surface layer, or can be void of them.

In a typical compression molding process the resinous core layer is heated in an infrared oven to a temperature sufficient to significantly soften the resin. For polypropylene this might be in the range of from about 180° C. to about 260° C. After the resin is well softened, the softened resinous core layer is placed in a relatively cool mold, and the mold is closed for molding. The mold temperature is typically at a temperature of about 75° to about 150° C. below the softening point or melting point of the resin. For polypropylene the mold temperature might be within a temperature range of from about 30° C. to about 100° C. A typical molding time would be about 15 to about 90 seconds. The temperature reached during the softening step, and the temperature, pressure and mold time of the molding step, will depend on the materials used and the size and shape of the article to be molded. The moldable composite sheet of the invention can be formed using other types of molding processes, such as flow molding, vacuum forming, injection molding, and blow molding, all of which are well known in the art.

Various nonresinous additives can be used to enhance the properties of the moldable composite sheet. Examples of these nonresinous additives include colorants, tougheners, antioxidants, UV stabilizers, fillers, flame retardants, fungicides, algaecides, electrically conductive particles and fibers, antimicrobials, antistats, color concentrates, heat stabilizers, mold release agents, smoke suppressants, surface active agents, pigments, and flexibilizers. In typical production of molded articles, these materials are mixed with the resin prior to the molding process. These additives can also be introduced into the resin/fiber flow of a cofiberizing process of the type illustrated in FIG. 1.

As provided in this invention, the cost of the moldable composite sheet is reduced, without materially affecting the properties of the molded product, by reducing or eliminating the additive in the core material while maintaining the additive in the resinous surface layer. The effect is to provide the benefit of the additive without wasting a majority of the additive in the interior of the moldable composite sheet. As an example, the moldable composite sheet can be colored by adding a nonresinous colorant, such as a pigment, to the resinous surface layer, rather than by adding the colorant to the entire core layer.

Even though a majority of the nonresinous additive will be in the surface layer, the core layer may still contain some of the additive. In some embodiments of the invention, however, the core material is substantially free of the additive, which means there is a concentration of less than 0.1 percent of the nonresinous additive. The ratio of the concentration of the nonresinous additive in the surface layer to the concentration of the nonresinous additive in the core layer is preferably greater than about 6:1, more preferably greater than about 10:1, and most preferably greater than about 50:1. In some molded composite sheets of the invention, of course, there is no additive in the core layer. The amount of the nonresinous additive in the surface layer is measured by determining the concentration of the additive, measured as a weight percentage of the resinous material in the surface layer. The amount of the nonresinous additive in the core layer is measured by determining the concentration of the additive, measured as a weight percentage of the resinous material in the core layer.

As shown in FIG. 1, bundles of additional fibers can be introduced into the composite sheet via any suitable means, such as a nozzle 78. These additional fibers can be any type of reinforcement appropriate for strengthening the composite product. A preferred additional reinforcement is bundles 80 of E glass fibers, with the bundles initially containing at least 50 and preferably 100 or more filaments. Typically, the additional glass fibers have lengths greater than about 0.5 cm.

It will be evident from the foregoing that various modifications can be made to this invention. Such, however, are considered as being within the scope of the invention.

INDUSTRIAL APPLICABILITY

The invention can be useful in the manufacture of thermoplastic articles suitable for molding into parts for automobiles, cabinetry for computers and other electronic equipment, recreational and agricultural equipment, building components and accessories, and components for small appliances and other consumer and industrial goods.

We claim:
1. A molded composite product comprising:
   a resinous core layer containing reinforcement fibers; and
   a resinous surface layer which is substantially free of reinforcement fibers, where the resinous surface layer includes a nonresinous additive at a concentration, measured as a weight percentage of the resinous mate- rial in the surface layer, which is higher than the concentration of the additive in the resinous core layer, measured as a weight percentage of the resinous material in the core layer, where the nonresinous additive is one or more materials selected from the group consisting of colorants, tougheners, antioxidants, UV stabilizers, flame retardants, fungicides, algaecides, electrically conductive particles and fibers, antimicrobials, antistats, color concentrates, heat stabilizers, mold release agents, smoke suppressants, surface active agents, pigments, and flexibilizers.

2. The molded composite product of claim 1 in which the ratio of the concentration of the nonresinous additive in the surface layer to the concentration of the nonresinous additive in the core layer is greater than about 6:1.

3. The molded composite product of claim 1 in which the ratio of the concentration of the nonresinous additive in the surface layer to the concentration of the nonresinous additive in the core layer is greater than about 10:1.

4. The molded composite product of claim 1 in which the core layer is substantially free of the nonresinous additive.

5. The molded composite product of claim 1 in which the ratio of the thickness of the surface layer to the thickness of the core layer is greater than about 1:6.

6. The molded composite product of claim 1 in which the thickness of the surface layer is within the range of from about 0.1 mm to about 1 mm, and the thickness of the core layer is within the range of from about 2 mm to about 2 cm.

7. The molded composite product of claim 6 in which the ratio of the concentration of the nonresinous additive in the surface layer to the concentration of the nonresinous additive in the core layer is greater than about 10:1.

8. The molded composite product of claim 1 which includes a second surface layer in addition to the resinous surface layer, the second surface layer providing structural balance to the molded composite product.

9. The molded composite product of claim 8 which the second surface layer is substantially free of reinforcement fibers, where the second surface layer includes a nonresinous additive at a concentration, measured as a weight percentage of the resinous material in the second surface layer, which is higher than the concentration of the additive in the resinous core layer, measured as a weight percentage of the resinous material in the core layer.

10. A moldable composite sheet comprising:
   a resinous core layer containing reinforcement fibers; and
   a resinous surface layer which is substantially free of reinforcement fibers, where the resinous surface layer includes a nonresinous additive at a concentration, measured as a weight percentage of the resinous material in the surface layer, which is higher than the concentration of the additive in the resinous core layer, measured as a weight percentage of the resinous material in the core layer, where the nonresinous additive is one or more materials selected from the group consisting of colorants, tougheners, antioxidants, UV stabilizers, flame retardants, fungicides, algaecides, electrically conductive particles and fibers, antimicrobials, antistats, color concentrates, heat stabilizers, mold release agents, smoke suppressants, surface active agents, pigments, and flexibilizers.

11. The moldable composite sheet of claim 10 in which the ratio of the concentration of the nonresinous additive in the surface layer to the concentration of the nonresinous additive in the core layer is greater than about 10:1.

12. The moldable composite sheet of claim 10 in which the core layer is substantially free of the nonresinous additive.

13. The moldable composite sheet of claim 10 in which the ratio of the thickness of the surface layer to the thickness of the core layer is greater than about 1:6, the thickness of the surface layer is within the range of from about 0.1 mm to about 1 mm, and the thickness of the core layer is within the range of from about 2 mm to about 2 cm.

14. A method for molding a composite product comprising:
   preparing a charge of resinous core material containing reinforcement fibers;
   applying a resinous surface layer, which is substantially free of reinforcement fibers, to the surface of the charge of core material, where the resinous surface layer includes a nonresinous additive at a concentration, measured as a weight percentage of the resinous material in the surface layer, which is higher than the concentration of the additive in the resinous core layer, measured as a weight percentage of the resinous material in the core layer, where the nonresinous additive is one or more materials selected from the group consisting of colorants, tougheners, antioxidants, UV stabilizers, flame retardants, fungicides, algaecides, electrically conductive particles and fibers, antimicrobials, antistats, color concentrates, heat stabilizers, mold release agents, smoke suppressants, surface active agents, pigments, and flexibilizers;
   introducing the charge and surface layer into a mold; and
   molding the charge and surface layer to form a composite product having a core layer and a surface layer.

15. The method of claim 14 in which the ratio of the concentration of the nonresinous additive in the surface layer to the concentration of the nonresinous additive in the core layer is greater than about 10:1.

16. The method of claim 14 in which the temperature of the core material is at least 100° C. higher than the temperature of the mold as the charge of core material and surface layer is introduced into the mold.

17. The method of claim 14 in which the temperature of the mold is cool enough to inhibit softening of the surface layer so that reinforcement fibers from the core material are prevented from migrating into the surface layer to an extent that the reinforcement fibers are visible in the molded composite product.

18. The molded product of claim 1 in which the nonresinous additive is a pigment.

19. The molded product of claim 1 in which the nonresinous additive is a colorant.

20. The molded product of claim 1 in which the nonresinous additive is a UV stabilizer.

* * * * *